Sept. 6, 1960  F. L. SMITH  2,951,664

STORES EJECTION MEANS

Filed March 18, 1957  2 Sheets-Sheet 1

INVENTOR.
Francis L. Smith
BY
John J. Sullivan
ATTORNEY.

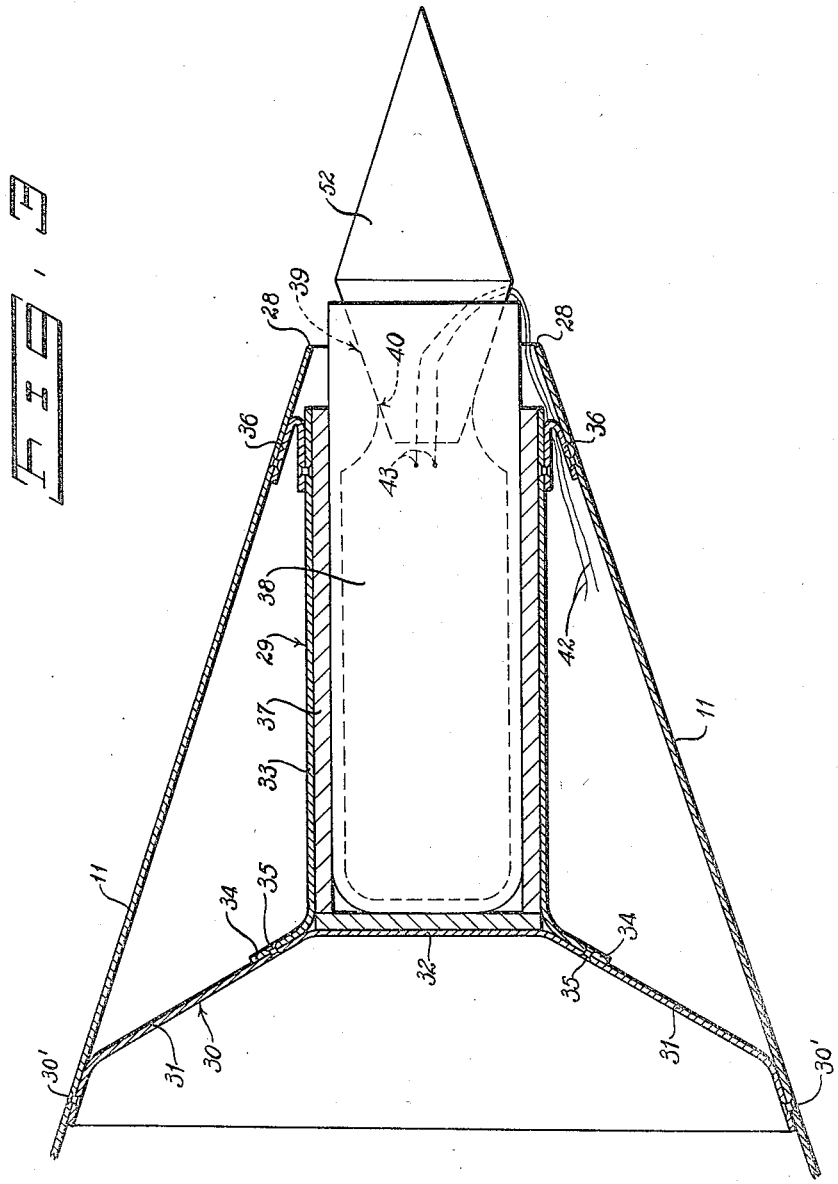

United States Patent Office 2,951,664
Patented Sept. 6, 1960

2,951,664

STORES EJECTION MEANS

Francis L. Smith, West Islip, N.Y., assignor to Republic Aviation Corporation, near Farmingdale, N.Y., a corporation of Delaware Filed Mar. 18, 1957, Ser. No. 646,824

12 Claims. (Cl. 244—135)

This invention relates to stores ejection and jettisoning means for use on aircraft and more particularly to an improved means for releasing and jettisoning an external store, such as a fuel tank, missile or the like, which is mounted on and carried by a component of an airplane.

Essentially, it is proposed hereby to release the store or tank and propel it generally in the direction of flight and at the same time impart to it a gradual trajectory away from the airplane thereby overcoming any tendency to tumble and assuring constant clearance of the airplane.

In doing this, the present invention employs to advantage the streamlined shape and other characteristics of an external store or tank to assist in attaining a smoother and cleaner aerodynamic separation of the store from the airplane.

Among its other objects, the instant invention contemplates the total elimination of heavy, complex ejecting and jettisoning mechanisms such as presently employed, as well as a substantial reduction in the structural rigidity and weight of the store to be ejected and the associated supporting component of the airplane necessary when using these prior mechanisms.

With the above and other objects in view, as will be apparent, this invention consists in the construction, combination and arrangement of parts all as hereinafter more fully described, claimed and illustrated in the accompanying drawings, wherein:

Fig. 3 is a longitudinal section taken through the aft end portion of the tank to show the propulsion means by which the tank is moved forwardly from the airplane after its release.

Figure 1:
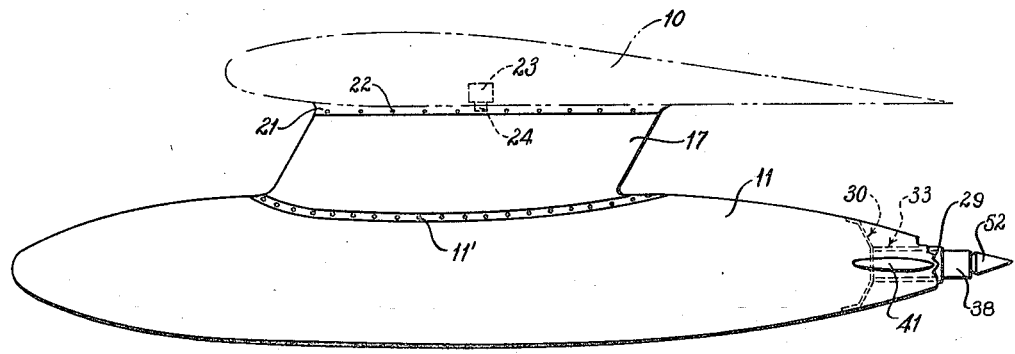
Fig. 1 is a view looking inboard of an airplane wing having an external store or fuel tank connected thereto by means of and through a strut or pylon to show generally the application of the present releasing and jettisoning means thereto, the aft end of the fuel tank being broken away and the wing profile being illustrated in broken lines.
Figure 2:
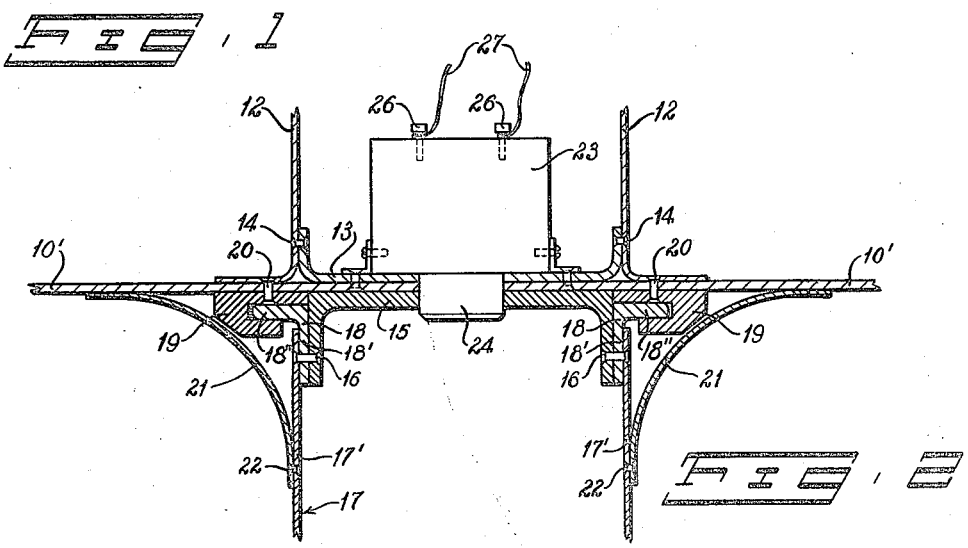
Fig. 2 is a fragmentary section taken transversely through the pylon and adjoining portion of the wing to show the connection between the pylon and the wing and the means for releasing the pylon and tank.

Heretofore, many mechanisms for the jettisoning or ejecting of tanks or stores have been proposed. Positive and forcible means of ejecting stores or tanks from an airplane in flight have been found necessary because of the tendency of the released store or tank to continue moving in the direction of flight and in close proximity to the airplane. Under these circumstances, any instability of the store or tank or any tumbling thereof could result in collision between the store or tank and the airplane and substantial damage to the latter.

The prior devices intended to prevent this collision between a released tank and an airplane have proposed to eject the tank or store laterally or outwardly from the airplane in a direction at right angles or normal to the line of flight and in so doing, overcome the aerodynamic loads and forces acting on the tank. Due to the resistance opposing any change in direction of movement of the store or tank relative to the line of flight, plus the magnitude of the effective aerodynamic forces and loads acting on the tank, ejection means of considerable size, power and weight have been employed. Indeed, explosive charges, inherently dangerous, have come to be used to separate the tank and airplane but with not too much success. At the same time the internal structure of both the store and the supporting component of the airplane must be reinforced and strengthened generally to withstand the ejecting force as well as reaction to this force.

The present invention contemplates a new approach to the problem of the jettisoning of external stores. In the present invention, the aerodynamic contour of the store or tank is employed to advantage in the propelled forward movement of the tank relative to the airplane after its release.

More specifically, the means for ejecting and jettisoning employed herein does not eject the store outwardly or laterally of the airplane, i.e. in a direction normal to the path of movement or flight of the airplane. On the contrary, the store is released from the airplane and propulsion means is energized automatically upon the completion of this release to launch the store or tank in the direction of flight of the airplane. One type of mounting means by which the store is connected to the airplane, such as that illustrated, acts to direct and guide it in its initial movement. The propulsion means necessary to so launch the store whereby it moves forwardly of the airplane generates sufficient power or thrust to not only overcome the forces acting on and against the store, i.e., drag, but since it initially is moving at the same speed as the airplane, the additional thrust of the propulsion means must be such that the store can quickly attain somewhat greater forward velocity than that of the airplane. Stabilizing fins provided at the aft end of the store may be prepositioned or angled to direct the store or tank on a trajectory away from the airplane and its path of flight.

Referring more particularly to the drawings, 10 designates a major component of an airplane, e.g. the wing from which an external store or fuel tank 11 is suspended. Conventional internal ribs 12 are provided within and chordwise of the wing 10. At the area where the tank 11 is suspended, a structural member or stiffener 13 is interposed between a pair of adjacent ribs 12. Flanges are provided at the opposite ends of the stiffener 13 for flush abutment against the adjoining surfaces of the ribs 12 where they are secured by suitable means such as rivets 14. The outer or lower face of the stiffener 13 is disposed in substantially flush contact with the inner surface of the skin 10' of the wing 10. The stiffener 13 thus serves to interconnect the ribs 12 one to the other and to strengthen the wing in this area whereby the loads imposed by the store or tank 11 upon its attachment thereto may be transferred to the internal structure of the wing 10 including the ribs 12.

A carrier 15 is disposed adjacent the outer undersurface of the wing 10 in opposition to the stiffener 13. Lateral flanges are provided at the opposite ends of the carrier 15 to be secured by bolts or rivets 16 to the inner adjacent faces of the side wall 17' of a supporting strut or pylon 17 by and through which the store is to be connected to the wing 10. This pylon 17 is streamlined in longitudinal section to substantially the shape of the wing profile as seen in Fig. 1. The tank 11 is fixedly secured to the pylon 17 at and along its outer or lower edge by rivets 11' to become in effect integral therewith.

An angle rail 18 is disposed with one arm 18' in flush abutment against each of the end flanges of the carrier 15 and is situated between such flanges and the wall 17' of the pylon 17 where it is held by the bolts or rivets 16. Arm 18' of the rail 18 is curved to conform to the contour of the pylon wall 17' and as it is positioned within the upper end of the pylon 17 is engaged between the flanges of the carrier 15 and the wall 17' of the pylon.

The other arm 18" of the rail 18 projects laterally from and outwardly of the carrier 15 to be disposed in spaced relationship to the outer surface of the skin 10' of the wing 10 and below the surface of the carrier 15. As the arm 18' of each rail 18 is disposed within the pylon 17 and is curved to agree with the curvature of the wall 17' thereof, the arm 18" of each rail 18 projects outwardly over the edge of the wall 17' to be disposed approximately parallel to the skin 10'. There is one rail 18 on each side of the pylon 17 and these rails must be substantially parallel. Therefore the width of the arm 18" of each rail 18 varies from point to point in its length to compensate for the curvature of the wall 17' of the pylon 17 and yet maintain a straight outer edge that is substantially parallel to the outer edge of the companion arm 18". The entire weight of the tank or store 11 is supported by the arms 18" of the rails 18 from the undersurface of the wing 10.

For cooperation with the arms 18" of the rails 18, a pair of tracks 19 are fixed to the undersurface of the wing 10 outwardly of the pylon 17. These tracks 19 are parallel one to the other and each is substantially equal in length to the length of the pylon 17 and the rails 18. Each track 19 is a channel in section open toward the pylon 17 and has one side riveted or otherwise secured to the wing 10 and its internal structure, as at 20. The arms 18" of the rails 18 are slidably received in the tracks 19 so that the tank or store 11 is supported by the tracks 19 through the rails 18 and may be propelled forwardly of the track when released.

Around the tracks 19 and coextensive in length therewith, so as to aerodynamically enclose and house the tracks 19 and the associated edge of the pylon 17, is a fairing 21. This fairing 21 is arcuate in section and forms a concave wall between the external wall of the pylon 17 and the undersurface of the wing. At and along one longitudinal edge, the fairing 21 is secured to the associated wall of the pylon 17 by rivets or other attaching means 22. The fairing 21 curves upwardly and outwardly so that its other longitudinal edge is disposed parallel to the skin 10' of the wing 10 with its marginal edge flush against the skin 10' of the wing 10 but is otherwise unconnected therewith.

Mounted internally of the wing 10 and preferably on the stiffener 13 is a releasable lock assembly 23. The stiffener 13, the carrier 15 and the skin 10' of the wing 10 are pierced by aligned or registered holes adapted to receive a reciprocable end of the core 24, or a projection thereof, of a solenoid 23' forming a part of the lock assembly 23. Suitable electrical terminals or binding posts 26 are provided to connect the solenoid 23' through wires 27 to a remote control located, e.g. in the cockpit of the airplane. Upon actuation of the control by the pilot, the core 24 is withdrawn or retracted inwardly of the solenoid 23' and thereby removed from the aligned holes or at least from the hole in the carrier 15 for the disconnection of the carrier 15 and pylon 17 from the wing 10.

Upon such disconnection of the pylon 17 and attached tank 11 are still engaged by the tracks 19 and the pylon 17 and tank 11, while free to move relative to the wing 10, are still supported by the latter. In order to effect the complete separation of the pylon 17 and tank 11 from the wing 10, propulsion means is provided in the aft end or tail cone of the tank 11. When operative after the release of the pylon and tank, as aforesaid, this propulsion means impels the tank and pylon forwardly, i.e. in the direction of flight, until the rails 18" are removed from the tracks 19 whereupon the tank or store 11 is entirely free of the airplane.

To mount and house a propulsion means, the tail cone of the tank or store 11 is foreshortened or cut off, as at 28, and a hollow housing 29 is fixedly secured therein around and concentric to the longitudinal axis of the tank 11, said housing being open at the end 28 of the tank. A closure wall or bulkhead 30 is provided within the tank 11 adjoining the inner end of its tail cone and is flanged at its periphery to rest flush against the internal surface of the tank 11 where it is fixedly secured by any suitable means 30'. Sealing means may be employed interposed between the abutting surfaces of the bulkhead 30 and the wall of the tank 11. The bulkhead 30 slopes angularly and rearwardly at 31 from its periphery to its center 32 which is flat and disposed in a plane normal to the longitudinal axis of the tank 11.

The housing 29 is defined by a cylindrical wall 33 having an internal diameter substantially equal to the diameter of the flat central portion 32 of the wall 30. At its inner end, the wall 33 terminates in an outward annular flare 34 which overlies and abuts the surface of the sloping portion 31 of the bulkhead 30 to which it is fixedly secured by rivets or like fasteners 35. The surface of the central portion 32 of the wall or bulkhead 30 thus serves as the bottom or base of the housing 29.

At its other or outer end, the wall 33 is secured to the wall of the tail cone of the tank 11 by means of and through either a single annular filet 36 or a series of spaced filets. Thus, the housing 29 is mounted within the tank 11 to become, in effect, a concentric integral part of the tank opening through its aft end 28 to the atmosphere.

A liner 37 of high-density heat insulating material completely covers the internal walls of the housing 29. An example of such a material is "Maronite" which is the trade name of a relatively light-weight material manufactured by Johns-Manville Corporation composed of loosely packed asbestos held together by a silicate binder. "Maronite," or a material having equivalent characteristics, is especially desirable in this application because of its relatively low conductive and high-temperature-resisting qualities. The function of the liner 37 is to insulate and thereby protect the housing 29 as well as the structure of the tank 11 from the heat generated by an explosive or rocket charge 38 disposed within the housing 29. This charge or rocket 38 is of standard manufacture and design and per se forms no part of the present invention. It comprises a cartridge or shell containing the explosive and terminates in a flared discharge nozzle 39 defining a throat 40 through which the products of combustion within the shell escape.

When the rocket 38 is ignited, the expanding gases produced thereby are discharged through the nozzle 39 and the resulting reaction forces are imposed on and against the center 32 of the wall 30. The pylon 17 and tank 11 having been released by the withdrawal of the lock or core 24 as described, activation of the rocket 38 moves or thrusts the tank 11 in a forward direction along the tracks 19. This thrust exceeds the opposing forces acting on the pylon 17 and attached tank 11 and, since the pylon and tank are at this time traveling at the same speed as that of the airplane, they accelerate ahead of the airplane. The free edge of the fairing 21 in contact with the undersurface of the wing 10 merely slides along the surface of the wing during this movement or launching of the pylon 17 and tank 11.

When the pylon 17 and tank 11 have completely cleared the tracks 19, its direction of flight or course is determined by the angular position of the horizontal control surfaces or fins 41 at the aft end thereof. Thus, by prepositioning the fins 41, the flight of the disconnected or released tank 11 is on a trajectory gradually downward or away from the airplane and its line of flight.

In order to ignite the rocket 38, wires or conductors 42 lead to and terminate in contact points 43 located in the rocket shell. When current is fed to the conductors 42, a spark or sparks pass between the points 43 to ignite the charge of the rocket 38. No invention is claimed in the details of mounting the contact points 43 in the rocket shell nor in the electrical connections thereof in the circuitry to be described. Similarly, electrical disconnection of the wires 42 from the circuitry may be effected, after ignition of the rocket's charge in any convenient and known manner. For example, suitable switch means may be employed to open the circuit to thereby interrupt the current flow therethrough. In addition or in the alternative quick separating connectors may be employed in the length of wires 42 which release the portion of such wires carried by the tank 11 from the remainder of the wires carried by the aircraft.

Figure 4:
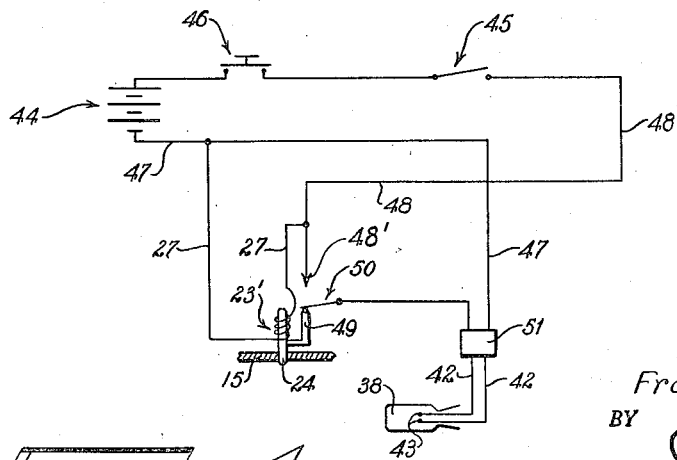
Fig. 4 is a diagram of the electrical circuits by which the release and propulsion means are sequentially operated.

For the operation of the solenoid 23' to withdraw its core 24 and release the tank 11 and pylon 17 and the subsequent ignition of the rocket 38, the circuitry shown in Fig. 4 may be employed.

A power source or battery 44 which can be the power source of the airplane, supplies the necessary current for the operation of the entire system. The main leads 47 and 48 from the opposite sides of the battery are respectively connected to the wires 27 from the coil of the solenoid 23' so that when the circuit consisting of the leads 47 and 48, the wires 27 and the coil of the solenoid 23' and including the battery 44 is closed, the coil is energized and the core 24 is retracted. This circuit includes an arming switch 45 between the battery 44 and the solenoid 23' which, when open, prevents the accidental closing of the circuit during servicing, maintenance and all ground operations of the airplane. This arming switch 45 is closed when the airplane is ready for take-off. A normally open operating switch 46 is also included in the circuit convenient to the pilot and it closes the circuit aforesaid to retract the core 24 of the solenoid 23' to thereby release the tank 11 and pylon 17 for movement forwardly relative to the tracks 19. This circuit constitutes the first or primary circuit in the control and operation of the invention and, of course, is normally open or inoperative, being completed and operative only upon closing of both switches 45 and 46.

In order to then ignite the rocket 38 a supplement or secondary circuit is provided. To this end, the main lead 47 from one side of the battery 44 is connected at all times through one of the wires 27 to one end of the coil of the solenoid 23' and also to one of the wires 42 connecting with a contact point 43 within the rocket 38, while the lead 48 from the opposite side of the battery 44 is connected to the other wire 27 and to a contact 48'.

The core 24 of the solenoid has a laterally projecting operating arm 49 and upon withdrawal of the core 24, it moves a switch 50 into engagement with the contact 48' connecting the lead 48 to the other of the wires 42. Thus, while the secondary circuit is normally open or inoperative, when the switch 50 engages contact 48', current is fed to both of the points 43 to generate a spark or sparks across said points for ignition of the rocket 38. If required, an ignition coil 51 may be employed in the wires 42 leading to the contact points 43 to augment the spark between said points.

In order to maintain the smooth, aerodynamic contour of the tank or store 11 during normal operation thereof when it is being carried in a fixed position under the wing 10 of the airplane, the aft end 28 of the tank may be closed by a conical plug 52. The plug 52 is adapted to be inserted in the discharge end 39 of the rocket 38 and terminates in a conical aft end which conforms to and continues the external surface of the tank 11. Plug 52 is fabricated of a frangible material, such as for example isocynate foam or foam styrene, each of which is characterized by its light-weight and heat-resistant qualities and yet is impervious to weather conditions. At the same time, upon ignition of the rocket 38, the plug 52 will be readily shattered to permit the escape of the products of combustion from the rocket 38.

The details of construction disclosed and described herein may be varied, changed or altered without departing from the spirit and scope of the present invention.

What is claimed is:

1. A mounting and jettisoning means for an external store carried by an airplane and having one end of a pylon secured thereto comprising a carrier secured to the opposite end of the pylon, a track substantially equal in length to said one end of the pylon fixed to and projecting from the airplane, a rail substantially coextensive in length to said track fixed to and projecting from the carrier for engagement and sliding cooperation with the track, a fairing secured at and along one of its longitudinal edges to the pylon and in abutting free contact at and along its other longitudinal edge with the airplane, a reciprocable lock mounted on the airplane and projecting into engagement with and securing the carrier against movement relative to the track, an actuator connected to said lock and operative to retract the lock and disengage the carrier whereby said carrier is free to move relative to the track, normally inoperative propulsion means at the aft end of the store, a projection carried by the lock and movable in unison therewith, and an electric circuit including a source of electric power and an open switch connected to said propulsion means, said projection being disposed adjacent and against said switch to close it when moving with the lock to the retracted position.

2. A mounting and jettisoning means for an external store carried by an airplane and having one end of a pylon secured thereto comprising a carrier fixedly secured to and extending from the opposite end of the pylon to abut a localized external surface of the airplane, a track carried by the airplane adjacent said localized surface and substantially coextensive in length to the transverse dimension of the pylon, a rail secured to the carrier and projecting laterally therefrom into engagement with said track for sliding cooperation therewith, a reciprocable lock mounted on and projecting from the airplane into engagement with the carrier to prevent relative movement of the track and rail, an explosive charge mounted in the aft end of the store, and an electric control including an electric power supply connecting the lock and charge in circuit and operable to retract the lock from its engagement with the carrier and subsequently fire the explosive charge whereby the carrier, pylon and store are propelled forwardly of the track and airplane.

3. In an airplane the combination with a component thereof, an external fuel tank carried by said component and a pylon fixedly attached at one of its ends to the tank, of a pair of rails secured to the other end of the pylon and projecting outwardly therefrom, a pair of spaced parallel tracks fixed to said component and complemental to for cooperation with said rails, a releasable lock securing the rails against movement relative to the tracks, an electric circuit including a source of electric power, an operating switch and a control to release said lock to free the rails for movement relative to the tracks, a closure wall internally of the tank adjacent the aft end thereof forming an isolated chamber opening at the rear of the tank, a rocket disposed in said chamber, and an electrical connection established by movement of said lock to the release position between said circuit and said rocket for the ignition of the rocket whereby the tank is independently propelled forwardly and in the direction of flight of the airplane.

4. In an airplane the combination with a component thereof an external fuel tank to be carried by said component and a pylon secured at one of its ends to said tank, of a local stiffener mounted internally of the component in abutment against the wall thereof, a pair of spaced parallel tracks secured to the exterior of the component one track being disposed adjacent each end of the stiffener, a carrier secured to the other end of the pylon and disposed between the tracks and in abutment against the wall of the component in opposition to the stiffener, an outstanding rail at each transverse end of the carrier for sliding cooperation with said tracks, a solenoid mounted internally of the component with its core projecting through aligned openings in the component and carrier whereby to engage the carrier and retain the pylon and tank against movement relative to the tracks and component, an electric circuit including a source of electric power and an operating switch connected to the solenoid to retract the core thereof and disengage the carrier, thereby freeing the pylon and tank for relative movement on said tracks, propulsion means carried by the tank, and a connection established between said circuit and said propulsion means in response to the freeing of the carrier as aforesaid, whereby current from the power source fires the propulsion means.

5. In an airplane the combination with a component thereof, an external store to be carried by said component and a pylon secured at one of its ends to the store, of a carrier secured to the opposite end of the pylon, a pair of spaced channelled tracks fixedly secured to the exterior of the component, a rail projecting from each side of the carrier, said rails being slidably engaged in the channels of the tracks, a solenoid in the component having a core normally projecting therefrom into engagement with the carrier and retractable into the component upon energizing the solenoid to thereby release the carrier, a rocket mounted in the aft end of the store and opening outwardly thereof, a primary electrical circuit including a power source, the coil of the solenoid, a normally open pilot-operated switch and an independent safety switch operable from the exterior of the airplane, a secondary circuit including the power source, the rocket and a normally open switch closed by the core when retracted to fire the rocket, and means carried by the store to direct it while being propelled by the rocket downwardly and away from the line of flight of the airplane.

6. A mounting and jettisoning means for an external fuel tank carried by an airplane comprising a releasable connection between the tank and the airplane, a housing mounted within the tank at the aft end thereof and opening rearwardly, a liner of high density heat insulating material defining the internal surfaces of said housing, normally inactive propulsion means mounted within said housing and terminating in a nozzle extending aftwardly thereof, means for releasing the connection, an electric circuit connected to said propulsion means including a source of electric power, a normally open switch and ignition means operable to fire the propulsion means when said switch is closed, a projection carried by said release means for operation concurrently therewith to close said normally open switch and thereby fire the propulsion means to impel the tank forwardly in the direction of flight of the airplane, and fixed control surfaces carried by the tank to direct its forward movement in a trajectory away from the line of flight of the airplane.

7. In an airplane the combination with a component thereof, an external fuel tank carried by said component and a pylon fixedly secured at one end to and projecting from the tank, of a rail carried by and projecting laterally from each side of the pylon at its other end, a pair of spaced parallel tracks secured to the component to receive and engage the rails for sliding cooperation therewith, a lock securing the rails against sliding movement relative to the tracks, a rocket including ignition means therefor disposed in the aft end of the tank, a release for said lock whereby the rails are freed for forward movement relative to the tracks, an electric circuit within the airplane, and a connection established between the ignition means of the rocket and said circuit upon operation of said release whereby the rails are freed as aforesaid and the rocket is sequentially fired.

8. In an airplane the combination with a component thereof having an external store mounted thereon, of means for releasing and jettisoning the store from the component comprising a reciprocable lock carried by the component and engaging said store to prevent such movement of the store, a solenoid operative when energized to retract the lock and release the store, a rocket mounted in the aft end of the store and opening outwardly and rearwardly thereof, a primary circuit to energize the solenoid, a pair of individual normally open switches in said primary circuit, one operable from within the airplane and the other operable externally thereof to close and operatively connect the main circuit, a secondary circuit between the primary circuit and the rocket, a normally open switch in such secondary circuit and operative in response to the energizing of said primary circuit to automatically close said secondary circuit after closing of the main circuit to thereby fire the rocket, and fixed fins on the store angularly disposed with reference to the line of flight to direct the store on a trajectory away from the airplane after its release and while propelled by the rocket in the direction of flight of the airplane.

9. In an airplane the combination with a component thereof having an external store mounted thereon, of means for ejecting and jettisoning the store from the component comprising a solenoid lock having a reciprocable core engaging and securing the store against movement relative to the component, an electric power source, a circuit including the power source and the solenoid lock, an open control switch in said circuit operative when closed to retract said solenoid core and thereby free the store for movement relative to the component, normally inactive propulsion means carried by the store, a normally open second circuit adjacent the solenoid lock and connected to the propulsion means, and a switch disposed between said second circuit and the solenoid lock in the path of movement of said lock for movement thereby to the closed position during retraction of the solenoid core whereby said propulsion means is actuated.

10. In an airplane the combination with a component thereof having an external store mounted thereon, of a device for relasing and jettisoning the store from the airplane comprising engagement means fixedly securing the store to the component, a pilot-controlled electrical circuit connected to said engagement means and operative to disengage it whereby the store is freed for movement relative to the component, normally idle propulsion means carried by the store, a secondary electric circuit between the pilot-controlled circuit and the propulsion means, and a normally open switch in said secondary circuit adjacent said engagement means and actuated thereby when disengaged as aforesaid to thereby close said secondary circuit and activate the propulsion means to move the store relative to the component.

11. In an airplane the combination with a component thereof and an external fuel tank to be carried by said component, of means for mounting said tank on said component for movement relative thereto and initially guiding the tank during such movement, a releasable lock immovably securing the tank to the component, a release to disengage said lock and free the tank for movement relative to the component, a bulkhead secured at its edge to the interior of the tank and defining an isolated chamber in one end of the tank with its rear wall open to atmosphere, a rocket disposed within said chamber, and means connected between said release and said rocket and operative in unison with said release to fire the rocket.

12. A mounting and jettisoning means for an external fuel tank carried by an airplane comprising a connection between the tank and the airplane, an electrically-operated control to move said connection to a position releasing the tank from the airplane, an explosive propulsion charge situated within the tank at the aft end thereof, an electric circuit connecting a source of electric power to the propulsion charge to fire it, said circuit including an open switch disposed adjacent said connection, and a projection carried by and extending from the connection and disposed in the plane of said switch to engage and move it to the closed position when the connection is moved to the releasing position aforesaid whereby the charge is fired and the tank propelled forwardly of and away from the airplane.

References Cited in the file of this patent

UNITED STATES PATENTS

| | | |
|---|---|---|
| 2,351,336 | Hooven | June 13, 1944 |
| 2,777,655 | Graham | Jan. 15, 1957 |
| 2,802,398 | Beach | Aug. 13, 1957 |

FOREIGN PATENTS

| | | |
|---|---|---|
| 701,960 | Great Britain | Jan. 6, 1954 |
| 1,115,485 | France | Jan. 3, 1956 |